US012583166B2

(12) United States Patent
Dyrlund

(10) Patent No.: US 12,583,166 B2
(45) Date of Patent: Mar. 24, 2026

(54) METHOD AND APPARATUS FOR FORMING TIRE COMPONENTS USING A COEXTRUDED STRIP

(71) Applicant: The Goodyear Tire & Rubber Company, Akron, OH (US)

(72) Inventor: Christopher David Dyrlund, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/312,286

(22) Filed: May 4, 2023

(65) Prior Publication Data

US 2023/0271368 A1     Aug. 31, 2023

Related U.S. Application Data

(60) Division of application No. 16/225,100, filed on Dec. 19, 2018, now Pat. No. 11,685,095, which is a
(Continued)

(51) Int. Cl.
B29C 48/49          (2019.01)
B29C 48/07          (2019.01)
(Continued)

(52) U.S. Cl.
CPC .............. B29C 48/49 (2019.02); B29C 48/30 (2019.02); B29C 48/37 (2019.02); B29D 30/52 (2013.01);
(Continued)

(58) Field of Classification Search
CPC ......... B29C 48/49; B29C 48/30; B29C 48/37; B29C 48/387; B29D 30/52
See application file for complete search history.

(56) References Cited

U.S. PATENT DOCUMENTS 3,584,343 A  *  6/1971  Kohlepp et al. ........ B29C 48/19
                                                             425/327
4,263,079 A      4/1981  Sutrina et al.
                     (Continued)

FOREIGN PATENT DOCUMENTS

CN        201283623      8/2009
CN        102114692      7/2011
                     (Continued)

*Primary Examiner* — Nahida Sultana
(74) *Attorney, Agent, or Firm* — Katherine A. Smith

(57)          ABSTRACT

One or more embodiments of the present invention provide an apparatus for applying a mixture of a first compound and a second compound, the apparatus comprising a first extruder for processing a first compound and a second extruder for processing a second compound, wherein the outlet from the first extruder is in fluid communication with a first channel of a housing, and the outlet from the second extruder is in fluid communication with a second channel of the housing, wherein a gear pump is positioned in each channel, wherein a nozzle is in fluid communication with an outlet of the first channel and an outlet of the second channel, and a coextruded continuous strip is produced. The ratio of the first compound to the second compound may be adjusted instantaneously.

9 Claims, 5 Drawing Sheets

Related U.S. Application Data continuation of application No. 15/183,085, filed on Jun. 15, 2016, now abandoned.

(60) Provisional application No. 62/186,422, filed on Jun. 30, 2015.

(51) Int. Cl.

| | |
|---|---|
| *B29C 48/30* | (2019.01) |
| *B29C 48/305* | (2019.01) |
| *B29C 48/37* | (2019.01) |
| *B29C 48/375* | (2019.01) |
| *B29D 30/52* | (2006.01) |
| *B29K 21/00* | (2006.01) |
| *B29L 30/00* | (2006.01) |

(52) U.S. Cl.

CPC ............ *B29C 48/07* (2019.02); *B29C 48/307* (2019.02); *B29C 48/387* (2019.02); *B29K 2021/00* (2013.01); *B29L 2030/002* (2013.01)

(56) References Cited

U.S. PATENT DOCUMENTS

| | | | | |
|---|---|---|---|---|
| 4,368,017 A | * | 1/1983 | Rasmussen | ............. B29C 48/08 |
| | | | | 425/467 |
| 4,526,528 A | | 7/1985 | Kline et al. | |
| 4,552,521 A | * | 11/1985 | Linnstaedter | .......... B29C 48/20 |
| | | | | 425/462 |
| 5,017,118 A | * | 5/1991 | Looman | .................. B29C 48/12 |
| | | | | 425/467 |
| 5,076,777 A | | 12/1991 | Schmitt | |
| 5,120,484 A | | 6/1992 | Cloeren | |
| 5,143,733 A | | 9/1992 | Von Buren et al. | |
| 5,156,781 A | | 10/1992 | Bohm et al. | |
| 5,224,838 A | | 7/1993 | Baumgarten | |
| 5,240,396 A | | 8/1993 | Bremyer | |
| 5,256,052 A | * | 10/1993 | Cloeren | .................. B29C 48/07 |
| | | | | 425/467 |
| 5,267,847 A | | 12/1993 | Bohm et al. | |
| 5,275,218 A | | 1/1994 | Nakayama et al. | |
| 5,292,472 A | | 3/1994 | Tompkins | |
| 5,968,429 A | | 10/1999 | Treece et al. | |
| 6,164,948 A | | 12/2000 | Cook | |
| 7,001,547 B2 | * | 2/2006 | Rasmussen | ........... B29C 48/313 |
| | | | | 264/40.7 |
| 8,017,002 B2 | | 9/2011 | Woestmann | |
| 9,346,227 B2 | * | 5/2016 | Sugimoto | .............. C08L 53/02 |
| 2001/0022410 A1 | | 9/2001 | Benatti | |
| 2002/0043280 A1 | * | 4/2002 | Ochiai | ............... B05B 12/1418 |
| | | | | 327/4 |
| 2002/0053390 A1 | | 5/2002 | Allen | |
| 2003/0209825 A1 | * | 11/2003 | Timmons | ............. B29C 48/307 |
| | | | | 425/464 |

| | | | | |
|---|---|---|---|---|
| 2004/0159964 A1 | * | 8/2004 | Lavoie | ................. H01M 4/0411 |
| | | | | 264/408 |
| 2005/0017387 A1 | * | 1/2005 | Harris | ................... B29C 48/903 |
| | | | | 264/211.21 |
| 2005/0184428 A1 | | 8/2005 | Kitagawa | |
| 2007/0031529 A1 | * | 2/2007 | Koch | ................. B29D 30/1628 |
| | | | | 425/461 |
| 2008/0063869 A1 | | 3/2008 | Mortazavi | |
| 2008/0138598 A1 | | 6/2008 | Michel et al. | |
| 2008/0149237 A1 | | 6/2008 | Cambron et al. | |
| 2009/0096129 A1 | | 4/2009 | Hirota et al. | |
| 2009/0173419 A1 | | 7/2009 | Kawakami | |
| 2011/0052746 A1 | * | 3/2011 | Sakaguchi | .............. B29C 48/18 |
| | | | | 425/518 |
| 2011/0244186 A1 | | 10/2011 | Dou et al. | |
| 2011/0272832 A1 | | 11/2011 | Neavin et al. | |
| 2011/0272849 A1 | | 11/2011 | Neavin et al. | |
| 2012/0161366 A1 | * | 6/2012 | Burg | ...................... B29B 7/748 |
| | | | | 425/462 |
| 2012/0263906 A1 | | 10/2012 | Ausen et al. | |
| 2012/0308755 A1 | | 12/2012 | Gorman et al. | |
| 2013/0075017 A1 | | 3/2013 | Kaes et al. | |
| 2013/0163368 A1 | * | 6/2013 | Milan | ..................... B29B 7/728 |
| | | | | 366/77 |
| 2013/0334722 A1 | | 12/2013 | Kitamura et al. | |
| 2014/0053961 A1 | | 2/2014 | Shimomura | |
| 2014/0113997 A1 | | 4/2014 | Winrow et al. | |
| 2015/0090381 A1 | * | 4/2015 | Shimomura | ........ B60C 11/0066 |
| | | | | 152/209.5 |
| 2015/0231804 A1 | | 8/2015 | Onimatsu | |
| 2015/0246468 A1 | | 9/2015 | Krammer | |
| 2015/0273746 A1 | | 10/2015 | Koch et al. | |
| 2015/0360398 A1 | * | 12/2015 | Monnereau | ............. B29C 48/12 |
| | | | | 425/141 |
| 2017/0001360 A1 | * | 1/2017 | Dyrlund | .................. B29C 48/07 |
| | | | | 425/461 |
| 2017/0043520 A1 | * | 2/2017 | Maia | ...................... B29C 48/71 |
| 2017/0334119 A1 | | 11/2017 | Liu et al. | |
| 2018/0093406 A1 | | 4/2018 | De Bruijn et al. | |
| 2018/0194054 A1 | | 7/2018 | Hombert | |
| 2018/0370074 A1 | * | 12/2018 | Ougier | .................. B29C 48/402 |
| 2019/0152116 A1 | | 5/2019 | Dyrlund et al. | |
| 2020/0282621 A1 | | 9/2020 | De Bruijn et al. | |
| 2021/0299928 A1 | | 9/2021 | Mottet et al. | |

FOREIGN PATENT DOCUMENTS

| | | | | |
|---|---|---|---|---|
| CN | 102602007 | | 7/2012 | |
| EP | 2027991 A1 | | 2/2009 | |
| EP | 2058114 A1 | | 5/2009 | |
| EP | 1935671 B1 | | 5/2011 | |
| EP | 2634430 A1 | | 9/2013 | |
| EP | 3012095 A1 | | 4/2016 | |
| JP | 2004-216725 | | 8/2004 | |
| JP | 2008526548 A | * | 7/2008 | ............ B29C 48/08 |
| WO | 2008101555 A1 | | 8/2008 | |

* cited by examiner

RADIAL AXIS

METHOD AND APPARATUS FOR FORMING TIRE COMPONENTS USING A COEXTRUDED STRIP

FIELD OF THE INVENTION

The invention relates in general to tire manufacturing, and more particularly to an apparatus for forming tire components.

BACKGROUND OF THE INVENTION

Tire manufacturers have progressed to more complicated designs due to an advance in technology as well as a highly competitive industrial environment. In particular, tire designers seek to use multiple rubber compounds in a tire component such as the tread in order to meet customer demands. Using multiple rubber compounds per tire component can result in a huge number of compounds needed to be on hand for the various tire lines of the manufacturer. For cost and efficiency reasons, tire manufacturers seek to limit the number of compounds available, due to the extensive costs associated with each compound. Each compound typically requires the use of a banbury mixer, which involves expensive capital expenditures. Furthermore, banbury mixers have difficulty mixing up tough or stiff rubber compounds. The compounds generated from the banbury mixers are typically shipped to the tire building plants, thus requiring additional costs for transportation. The shelf life of the compounds is not finite, and if not used within a certain time period, is scrapped.

Thus it is desired to have an improved method and apparatus which provides independent flow of two or more compounds from a single application head. More particularly, it is desired to be able to make a custom tire tread directly onto a tire building machine in an efficient manner, reducing the need for multiple stations.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which.

DETAILED DESCRIPTION OF THE INVENTION

Figure 1:
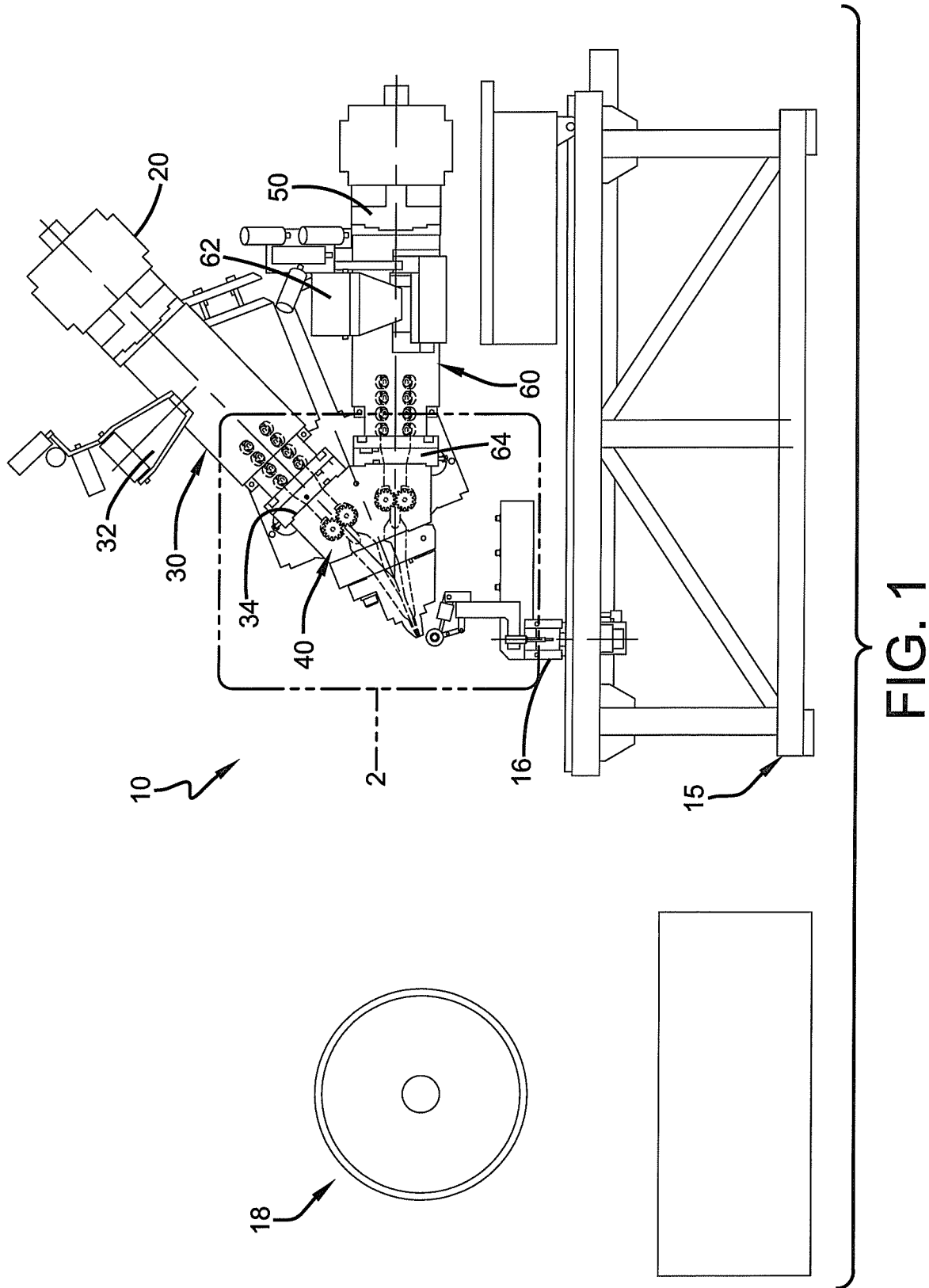
FIG. 1 is a schematic of a compound switching apparatus of the present invention.

FIG. 1 illustrates a first embodiment of a compound switching apparatus 10 suitable for use for making rubber compositions for tires or tire components such as the tread. The compound switching apparatus 10 is not limited to tire applications and may be used for example, to make other rubber components not related to tires such as conveyors, hoses, belts, etc. The compound switching apparatus 10 is particularly suited for making a tread or small tire components having a varying composition, such as inserts, apexes and treads (including those for retreaded tires). The compound switching apparatus 10 may be provided directly at the tire or component building station for direct application of the rubber composition to a tire building drum or other component building apparatus.

The compound switching apparatus 10 is mounted upon a support frame 15. A translatable support bar 16 is mounted to the upper end of the support frame. Preferably, the compound switching apparatus 10 is mounted upon a translatable support bar 16, that can translate fore and aft in relation to a tire building machine 18.

As shown in FIG. 1, the compound switching apparatus 10 includes a first extruder 30 and a second extruder 60, preferably arranged side by side as shown. The first extruder 30 has an inlet 32 for receiving a first rubber composition A as described in more detail, below. The first extruder 30 is driven by motor 20. The second extruder 60 has an inlet 62 for receiving a second rubber composition B as described in more detail, below. The second extruder 60 is driven by electrical motor 50. The first or second extruder 30,60 may comprise any commercial extruder suitable for processing of rubber or elastomer compounds. The extruder may comprise a commercially available extruder commonly known by those skilled in the art as a pin type extruder, a twin screw or a single screw extruder, or a ring type of extruder. One commercially available extruder suitable for use is a multi-cut transfermix (MCT) extruder, sold by VMI Holland BV, The Netherlands. Preferably, the extruder has a length to diameter ratio (L/D) of about 5, but may range from about 3 to about 10. A ring type, pin type or MCT type of extruder is preferred, but is not limited to same.

The first extruder inlet 32 receives a first compound A, examples of which are described in more detail, below. The first extruder 30 functions to warm up a first compound A to the temperature in the range of about 80° C. to about 150° C., preferably about 90° C. to about 120° C., and to masticate the rubber composition as needed. The output end 34 of the first extruder 30 is connected to an inlet end 43 of a first gear pump 42. Compound A is thus first extruded by the first extruder 30 and then pumped by the first gear pump 42 into a nozzle 80. The first gear pump 42 functions as a metering device and a pump and may have gears such as planetary gears, bevel gears or other gears.

The second extruder inlet 62 receives a second compound B, examples of which are described in more detail, below. The second extruder 60 functions to warm up the second compound B to the temperature in the range of about 80° C. to about 150° C., preferably about 90° C. to about 120° C., and to masticate the rubber composition as needed. The output end 64 of the second extruder 60 is connected to an inlet end 45 of a second gear pump 44. Compound B is thus extruded by the second extruder 60 and then pumped by the second gear pump 44, which functions as a metering device and a pump and may have gears such as planetary gears, bevel gears or other gears.

Figure 2:
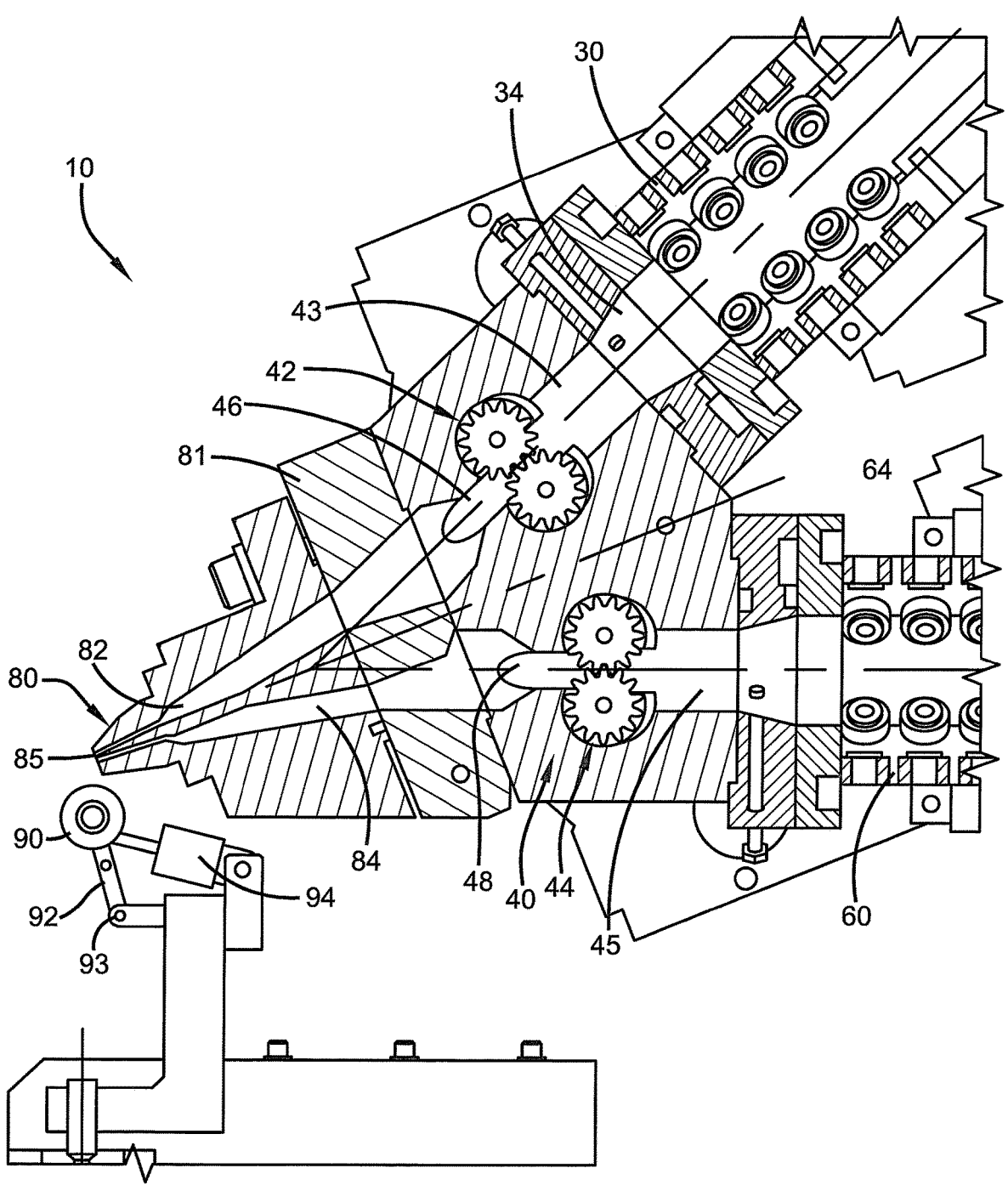
FIG. 2 is a close up cross-sectional view of the compound switching apparatus of FIG. 1 of the present invention.

The first and second gear pumps 42,44 are preferably housed in a single housing 40 and are placed in close proximity to each other so that the outlet channels 46,48 of the first and second gear pumps are also in close proximity, as shown in FIG. 2. The outlet channels 46,48 are fed into a nozzle assembly 80. The nozzle assembly 80 includes a dual passageway nozzle outlet 85 mounted on a mounting flange 81. The nozzle assembly 80 has two internal passageways 82,84 throughout shown in FIG. 2, that maintain separation of the rubber flow from each extruder 30,60 to the nozzle outlet 85. Alternatively, the nozzle outlet 85 may have only a single flow passageway in fluid communication with internal passageways 82,84.

A rotatable stitcher roller 90 is mounted adjacent the nozzle outlet 85 of the nozzle assembly 80. The stitcher roller 90 is pivotally mounted upon a support stand 92. An actuator 94 connected to the stitcher roller 90 pivots or rotates the support stand 92 about its end 93 when actuated.

Figure 3:
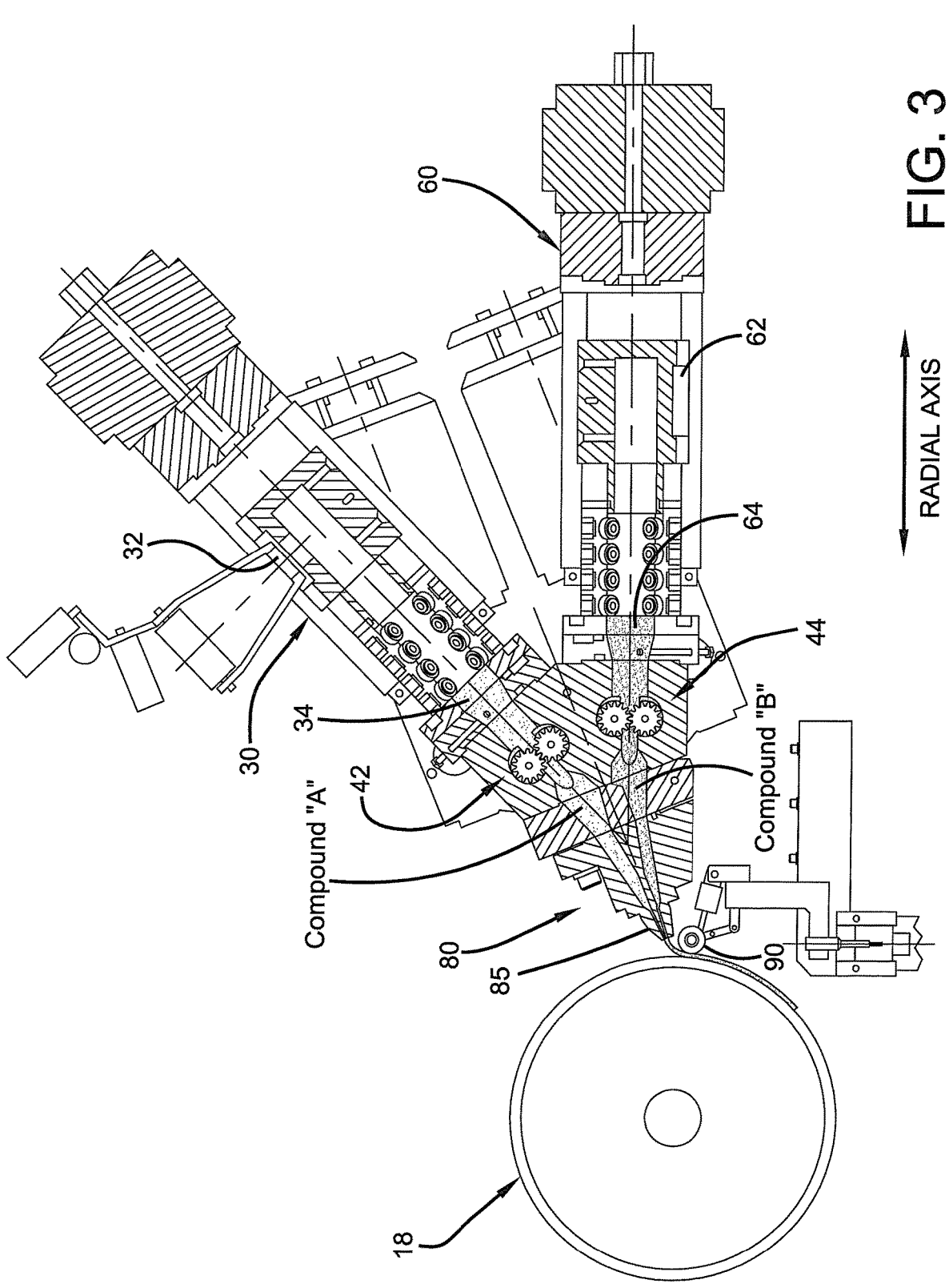
FIG. 3 is a cross-sectional view of the compound switching apparatus in use.

FIG. 3 illustrates the compound switching apparatus 10 located adjacent a tire building drum. FIG. 3 illustrates a first compound A being applied to the tire building drum. After compound A is applied, a second compound B can be applied to the tire building drum without the need for retracting the equipment or otherwise altering the equipment.

New Material

Figure 4:
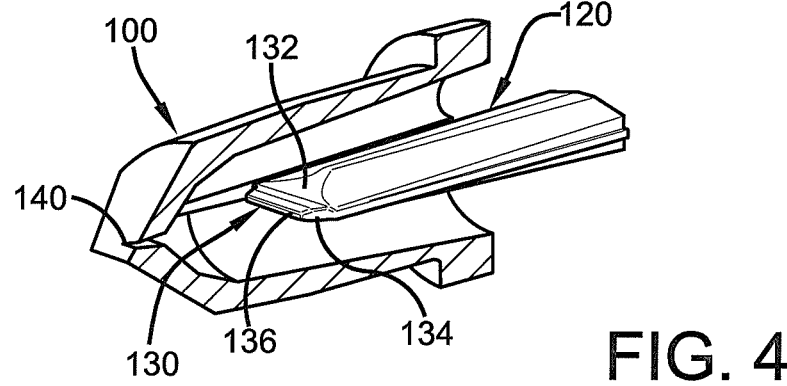
FIG. 4 is a perspective cutaway view of a coextrusion nozzle of the present invention.
Figure 5:
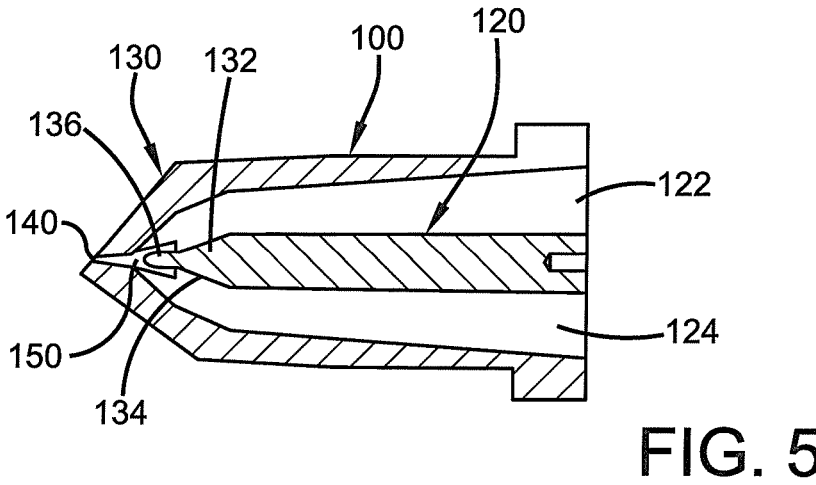
FIG. 5 is a side cross-sectional view of the coextrusion nozzle of FIG. 4.
Figure 6:
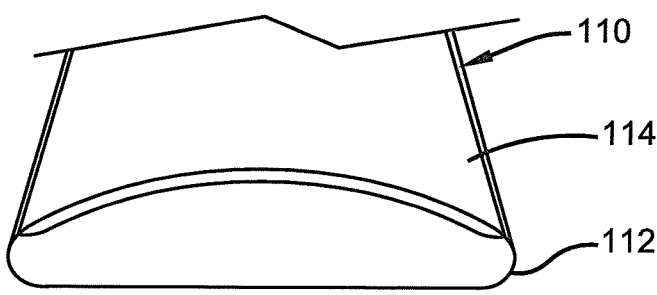
FIG. 6 is a perspective view of a co-extruded strip of two compounds of the present invention.
Figures 7A, 7B, 7C, 7D, 7E, 7F, 7G:
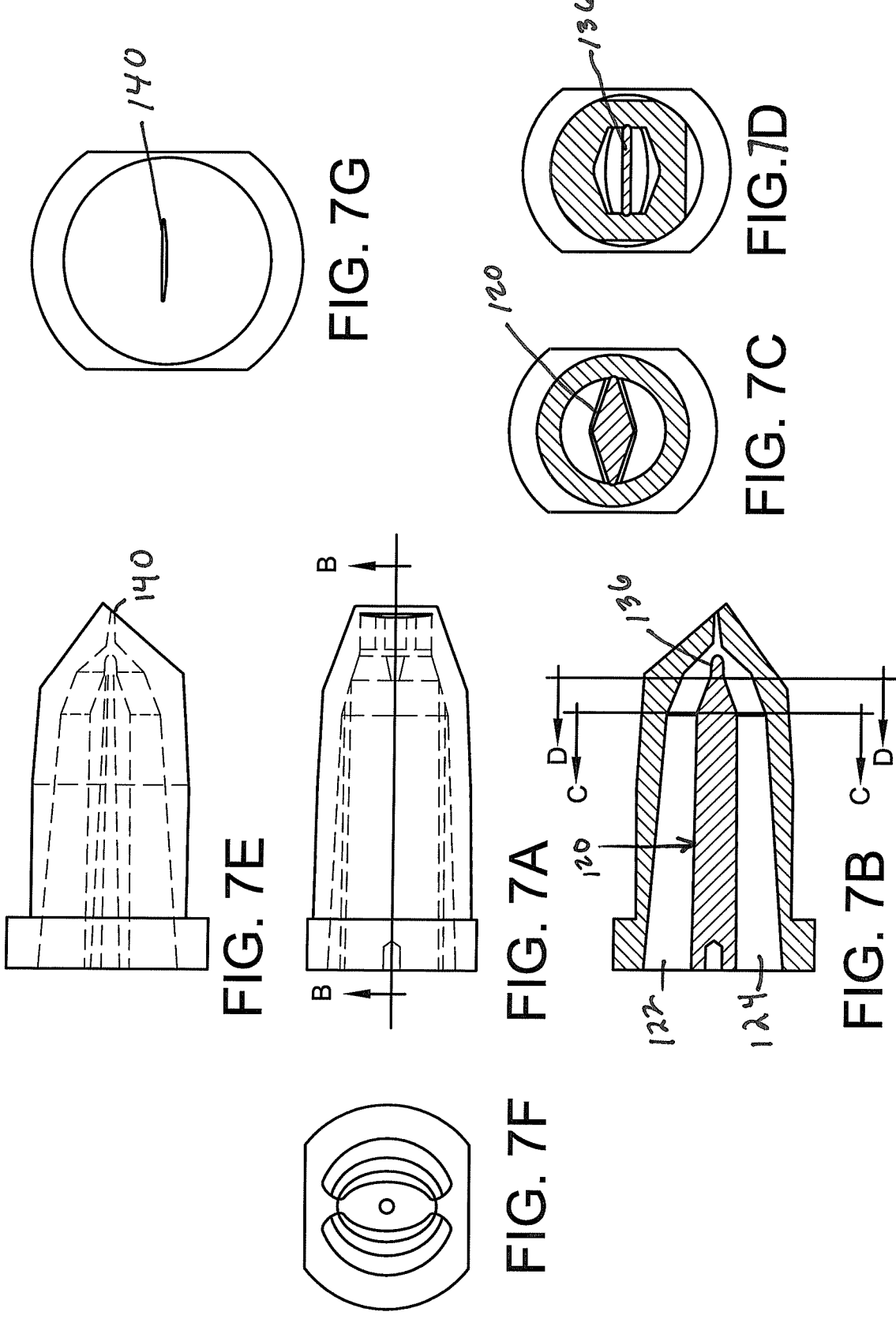
FIG. 7A is a top view of the coextrusion nozzle of FIG. 4.
FIG. 7B is a cross-sectional view in the direction B-B of FIG. 7A.
FIG. 7C is a cross-sectional view in the direction C-C of FIG. 7B.
FIG. 7D is a cross-sectional view in the direction D-D of FIG. 7B.
FIG. 7E is a cross-sectional view in the direction B-B of FIG. 7A.
FIG. 7F is an end view of FIG. 7A.
FIG. 7G is a front view of the coextrusion nozzle of FIG. 7A.

FIGS. 4-6 illustrate a second embodiment of a co-extrusion nozzle 100 suitable for use with the dual compound switching apparatus 10 of the present invention. The co-extrusion nozzle 100 is useful for forming a co-extruded or dual compound continuous strip as shown in FIG. 6. The co-extrusion nozzle 100 has a removable insert 120 that functions to divide the nozzle into a first and second flow passageway 122,124. The removable insert 120 is preferably rectangular in cross-sectional shape. The removable insert 120 has a distal end 130 with tapered ends 132,134 forming a nose 136. The nose 136 is positioned adjacent the nozzle die exit 140 and spaced a few millimeters from the die exit 140. The region between the nose 136 and the die exit 140 is a low volume coextrusion zone 150 that is high pressure. In the low volume coextrusion zone 150, compound A flowstream 122 merges with compound B flowstream 124.

The dual compound switching apparatus 10 with the coextrusion nozzle 100 produces a co-extruded strip 110 having a first layer 112 of a first compound A, and a second layer 114 of a second compound B. The first layer 112 and the second layer 114 are not mixed together, and are joined together at an interface in a coextrusion zone of the nozzle. The co-extrusion zone is located upstream of the nozzle die, where the compound A flow stream joins with the compound B flow stream.

The dual compound switching apparatus 10 can be used to vary the volume ratio of compound A to compound B by varying the ratio of the speed of gear pump of compound A to the speed of gear pump of compound B. The dual compound switching apparatus 10 can adjust the speed ratios on the fly, and due to the small residence time of the coextrusion nozzle, the apparatus has a fast response to a change in the compound ratios. This is due to the low volume of the coextrusion zone. The dual compound switching apparatus 10 with the coextrusion nozzle may be used to coextrude a dual compound strip in a continuous manner onto a tire building drum. The ratio of compound A to compound B may be varied by changing the speed ratio of the gear pumps.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for forming a coextruded strip of a first compound A and a second compound B for a tire component, the method comprising the steps of:

extruding a first rubber compound A through a first extruder and a first gear pump and into a first passageway of a co-extrusion nozzle, extruding a second rubber compound B through a second extruder and a second gear pump and into a second passageway of the co-extrusion nozzle, wherein the co-extrusion nozzle includes an outlet, and the first and second passageways are joined together immediately upstream of the outlet of the co-extrusion nozzle, and wherein the first and second gear pumps are housed in a single housing.

2. The method of claim 1 wherein the co-extrusion nozzle has an insert which divides the nozzle into a separate first and second passageway.

3. The method of claim 2 wherein the insert has a distal end for positioning adjacent the outlet of the co-extrusion nozzle, wherein the distal end has an elongated flat portion.

4. The method of claim 1 wherein the ratio of the volume of rubber compound A to the volume of rubber compound B is varied by changing the ratio of the speed of the first gear pump to the second gear pump.

5. The method of claim 4 wherein the ratio of the first gear pump to the second gear pump may be varied during operation of the system.

6. The method of claim 2 wherein the insert is removable.

7. The method of claim 2 wherein the insert has a rectangular cross-sectional shape.

8. The method of claim 1 wherein the strip is formed in a continuous manner.

9. The method of claim 1 wherein the strip is applied in a continuous manner to a tire building machine to build a tire component.

\*    \*    \*    \*    \*